Patented Apr. 12, 1938

2,113,764

UNITED STATES PATENT OFFICE 2,113,764

MANUFACTURE OF LAMINATED GLASS

Maurice L. Macht, Jersey City, N. J., assignor, by mesne assignments, to E. I. du Pont de Nemours & Company, Wilmington, Del., a corporation of Delaware No Drawing. Application July 18, 1936, Serial No. 91,426

6 Claims. (Cl. 49—81)

This invention relates to the manufacture of laminated glass, i. e., safety glass, and, more particularly, to the treatment of the interlayer sheeting used therein.

The type of laminated glass herein considered comprises at least one sheet of glass bonded to a preformed sheet of organic plastic which is known as the "interlayer"; more generally, the plastic sheet of interlayer is interposed between two sheets of glass. In recent years, these interlayers have been made relatively pliable and soft; this has been accomplished by increasing the proportion of plasticizer used in the plastic composition from which the interlayers are made, or making the interlayers from synthetic resins which are inherently relatively pliable and soft, or employing both expedients.

Although the softer, more pliable interlayers have outstanding advantages for use in laminated glass, their tackiness, or self-adhesiveness, at ordinary temperatures has raised a serious problem in handling and shipping. Many of the more desirable plastic compositions for interlayers have heretofore been barred from use because they were so tacky, or self-adhesive, that no commercially practical method of handling and shipping them could be devised.

The plastic for the interlayer is either formed into individual sheets which are stacked for handling and shipping, or is rolled up on itself on a mandrel in continuous lengths for handling and shipping. Even where the interlayer sheeting is not obviously tacky in the ordinary sense of the word, when it is cut in sheets and piled in a stack, or when it is rolled up in continuous lengths, under normal conditions of shipping and storage, it tends to become stuck together sufficiently so that it cannot be separated without difficulty or damage; the term "self-adhesive" is used herein to denote that degree of adhesiveness of the interlayer sheeting which may not necessarily be obviously tacky but which possesses a latent adhesiveness that may only become effective under storage conditions involving pressure (the weight of material above or from the tension in a tight roll) and summer warmth.

An object of the present invention is to provide a practical method of handling, packing, shipping, and storing self-adhesive or tacky interlayer sheets either as individual sheets or in continuous lengths. A further object is to provide a method of rendering such interlayer sheeting non-self-adhesive for purposes of shipping, and the like, without detrimental effect upon the appearance or protective character of the laminated glass employing it and without entailing any substantial increase in cost, or adding complications to the usual laminating practice. Other objects of the invention will be apparent from the description given hereinafter.

The above objects are accomplished according to the present invention by depositing on the surface of a tacky or, at least, a self-adhesive interlayer, either in the form of individual sheets or continuous lengths, a thin layer of a non-self-adhesive substance inert toward the material of the interlayer and soluble in a liquid also inert toward the material of the interlayer, and thereafter when it is desired to use the interlayer in making laminated glass, washing the non-self-adhesive substance from the interlayer with the liquid, removing the liquid from the interlayer by evaporation, or the like, and then bonding the interlayer to glass.

Preferably, the invention is carried out by coating the surfaces of the interlayer with a thin layer of a pulverized non-self-adhesive solid substance such as borax, sodium chloride, or neutral soap, which is inert toward the material of the interlayer and soluble in water and thereafter when it is desired to use the interlayer in making laminated glass, washing the pulverized substance from the interlayer with water, drying the interlayer, and then bonding the interlayer to glass, either with or without the use of an auxiliary adhesive. If desired, the solid substance used for the coating may be insoluble in water but soluble in some relatively cheap liquid which is inert toward the material of the interlayer and hence can be used to remove the solid substance without impairing the interlayer.

In an alternative form, the present invention may be carried out by coating the surfaces of the interlayer with a non-volatile liquid which is non-self-adhesive, instead of a pulverized solid substance. It will be understood that the expression "inert toward the material of the interlayer", whether applied to the non-self-adhesive coating or the liquid used to remove the coating, means that the substance in question has neither chemical, solvent, nor swelling action upon the interlayer material.

The following examples, wherein parts are given by weight, illustrate specific embodiments of the invention:

*Example 1.*—An interlayer sheeting, composed of 49.5 parts by weight of a formaldehyde-modified polyvinyl acetate resin made in acetic acid solution and recovered therefrom, 30 parts of diethyl phthalate and 20.5 parts of dimethyl phthalate, is of distinctly self-adhesive character. It is sprinkled with an approximately uniform coating of finely pulverized borax amounting to about 1.5 grams per square foot of its surface, or about 12 grams per linear foot of a continuous sheeting 4 feet in width.

The sheeting thus protected may be packed and shipped and stored without risk that the adjacent sheets will stick together. Adjacent sheets fail to stick together in an artificial storage test in which successive layers are stacked under a weight of 12 pounds per square inch and stored at 45° C. for 24 hours.

Before being assembled with the glass for lamination, the sheeting is freed from its coating of borax by a dip in distilled water, followed by rinsing with distilled water and drying.

Example 2.—Pulverized neutral soap is used in the same manner as the borax in Example 1 with substantially the same effect.

Example 3.—An interlayer sheeting composed of:

| | Parts |
|---|---|
| Cellulose acetate | 35 |
| Dimethyl phthalate | 65 | is distinctly self-adhesive. It is treated with borax in the same manner as was the sheeting in Example 1, and with analogous results.

Example 4.—The self-adhesive sheeting of Example 3 is coated with pulverized stearic acid in an amount of about 2 grams per square foot of surface. When the sheeting is being prepared for use with glass, the stearic acid is removed by rinsing with hexane.

Example 5.—An interlayer sheeting composed of pyroxylin (of approximately 11% nitrogen content and of the type customarily used in plastics) 100 parts, dimethyl phthalate 130 parts, is distinctly self-adhesive.

It is coated with pulverized sodium chloride at a rate of approximately 3 grams per square foot of surface. The salt is subsequently removed by dipping the sheeting into distilled water and rinsing with distilled water.

Example 6.—A self-adhesive sheeting of a base of gelatin is dusted over with pulverized stearic acid at a rate of approximately 1 gram per square foot of surface. This is subsequently removed by being dissolved in alcohol.

Example 7.—A self-adhesive sheeting composed of:

| | Parts |
|---|---|
| Polymethyl alpha methacrylate | 100 |
| Dibutyl phthalate | 125 | is sprayed with a 6% solution of gelatin in water. The coating is dried. The sheeting may be handled, packed, shipped and stored without special precautions. The coating is removed by warm water and the sheeting rinsed and dried before use.

Example 8.—A self-adhesive sheeting of methyl acrylate-methyl alpha methacrylate interpolymer is dipped into glycerine. The coating of glycerine which remains upon it makes it non-self-adhesive. The glycerine is washed off with water before the sheeting is used for lamination with glass.

Example 9.—A self-adhesive interlayer of a base of the vinyl resin known as Vinylite X (Chemical and Metallurgical Engineering, 43 177, April 1936) is coated with powdered borax as in Example 1, and is thereafter handled as was the sheeting of that example.

It will be understood that the above examples are merely illustrative and that the present invention is applicable to interlayer sheeting of the self-adhesive, or tacky type, regardless of its specific composition. In most instances, the interlayer sheeting is of a plastic composition inert to water so that, for obvious reasons of economy and convenience, the non-self-adhesive protective coating will be chosen from water soluble substances. However, as shown in specific Example 8, the present invention is applicable for treating interlayer sheeting affected by water.

Among the water soluble inorganic solid substances which may be used for the protective coating on the interlayer sheeting, may be mentioned such inexpensive and neutral salts as aluminum sulfate, ammonium sulfate, calcium acetate, magnesium sulfate, sodium chloride, and sodium sulfate. Other water soluble substances adapted for use in the present invention include urea, ethylene glycol, diethylene glycol, sulfonated castor oil, the sodium and ammonium salts of sulfonated lauryl alcohol, gum tragacanth, glycol starch, starch, pectin, and gum arabic. Also, there may be used paraffin, soluble in hexane, myristic acid, soluble in ethylene dichloride, hydrogenated cotton seed oil, soluble in hydrocarbon or chlorinated solvents, petrolatum, soluble in hexane, and Montan wax, soluble in hexane.

Where a solid pulverized non-self-adhesive substance is employed for coating the interlayer sheeting, it may be conveniently applied by dusting, spraying, or passing the interlayer sheeting through a compartment containing the powdered material, or, if preferred, it may be applied in solution, preferably in the same liquid which will subsequently be used to wash it from the interlayer sheeting. Similarly, a liquid coating substance may be applied by spraying, brushing, dipping, and the like.

Depending upon the manner of handling the material, either one or both sides of the interlayer sheeting will be coated.

The non-self-adhesive coating substance is preferably non-hygroscopic and, where a solid, should be finely enough powdered so that individual granules or crystals will not tend, under pressure, to become embedded in the surface of the sheeting or to leave objectionable imprints therein.

Ordinarily, the protective coating will be left on the interlayer sheeting during packing, handling, and shipping and will be removed just prior to the actual laminating step. The coating substance may be conveniently removed during the washing treatment which is a normal step in the sequence of operations in manufacturing laminated glass.

While a large number of substances adapted to be used as the protective coating have been disclosed, it will be obvious to those skilled in the art that, for interlayer sheeting of a specific composition, some of the substances disclosed will have advantages over others.

An advantage of the present invention is that it provides a method of eliminating the self-adhesiveness or tackiness of interlayer sheeting and thus tremendously facilitates the handling, packing, shipping, and storing of interlayers of this type even under extreme conditions of temperature. Further, the protective coating is readily removed from the interlayer before the latter is used and does not in any way impair the appearance or character of the laminated glass made from it.

Both the application and the removal of the protective coating substances are simple and inexpensive operations and numerous substances of low cost are readily available for use as the protective coating. Accordingly, the advantages of the invention are gained at comparatively little expense.

As many apparently widely different embodiments of this invention may be made without departing from the spirit and scope thereof, it is to be understood that the invention is not limited to the specific embodiments thereof except as defined in the appended claims.

I claim:

1. An interlayer for use in laminated glass comprising a self-adhesive sheet of water insoluble plastic material having at least one surface coated with a thin layer of pulverulent borax.

2. In the manufacture of laminated glass, the steps comprising depositing on the surface of a self-adhesive interlayer sheet of plastic material, a thin layer of a non-self-adhesive substance inert toward the plastic material and soluble in a liquid inert toward the plastic material, allowing said thin layer of non-self-adhesive substance to remain on the surface of said interlayer sheet during the packing, handling, shipping, and storing of said interlayer sheet, thereafter washing said non-self-adhesive substance from the interlayer sheet with said liquid, removing said liquid from said interlayer sheet, and bonding the said interlayer sheet to glass.

3. In the manufacture of laminated glass, the steps comprising depositing on the surface of a self-adhesive interlayer sheet of water insoluble plastic material, a thin layer of a non-self-adhesive substance inert toward the plastic material and soluble in water, allowing said thin layer of a non-self-adhesive substance to remain on the surface of said interlayer sheet during the packing, handling, shipping, and storing of said interlayer sheet, thereafter washing said non-self-adhesive substance from the interlayer sheet with water, drying said interlayer sheet, and bonding said interlayer sheet to glass.

4. In the manufacture of laminated glass, the steps comprising depositing on the surface of a self-adhesive interlayer sheet of water insoluble plastic material, a thin layer of a pulverulent, non-self-adhesive solid substance inert toward the plastic material and soluble in water, allowing said thin layer of a non-self-adhesive substance to remain on the surface of said interlayer sheet during the packing, handling, shipping, and storing of said interlayer sheet, thereafter washing said non-self-adhesive substance from the interlayer sheet with water, drying said interlayer sheet, and bonding said interlayer sheet to glass.

5. In the manufacture of laminated glass, the steps comprising depositing on the surface of a self-adhesive interlayer sheet of water insoluble plastic material, a thin layer of pulverulent borax, allowing said thin layer of borax to remain on the surface of said interlayer sheet during the packing, handling, shipping, and storing of said interlayer sheet, thereafter washing said borax from the interlayer sheet with water, drying said interlayer sheet, and bonding said interlayer sheet to glass.

6. In the manufacture of laminated glass, the steps comprising depositing on the surface of a self-adhesive interlayer sheet of water insoluble plastic material, a thin layer of a non-self-adhesive, non-volatile liquid inert toward the plastic material and soluble in water, allowing said thin layer of a non-self-adhesive, non-volatile liquid to remain on the surface of said interlayer sheet during the packing, handling, shipping, and storing of said interlayer sheet, thereafter washing said non-self-adhesive substance from the interlayer sheet with water, drying said interlayer sheet, and bonding said interlayer sheet to glass.

MAURICE L. MACHT.